United States Patent [19]
Mueller et al.

[11] 3,723,966
[45] Mar. 27, 1973

[54] INTERROGATING TIRE PRESSURE INDICATOR
[75] Inventors: Rolf K. Mueller, Brighton; William G. Wolber, Southfield, both of Mich.
[73] Assignee: The Bendix Corporation, Southfield, Mich.
[22] Filed: Sept. 14, 1970
[21] Appl. No.: 71,706

[52] U.S. Cl. .................340/58, 325/117, 200/61.22
[51] Int. Cl. ..............................................B60c 23/02
[58] Field of Search ..........340/58; 200/61.22, 61.25; 325/117, 113, 8

[56] References Cited
UNITED STATES PATENTS 2,274,557  2/1942  Morgan et al.....................340/58 UX
2,958,781  11/1960  Marchal et al.....................325/8 UX
2,452,156  10/1948  Schover............................340/195
3,281,808  10/1966  Church et al........................340/183
2,193,102  3/1940  Koch.........................................325/8

Primary Examiner—Alvin H. Waring
Attorney—John R. Benefiel and Plante, Hartz, Smith and Thompson

[57] ABSTRACT

A tire pressure indicating arrangement in which a passive transponding element is used as the tire pressure condition responsive sensor at each tire and an active transmitter is used to interrogate either successively or simultaneously each transponder, each of which is in turn adapted to transpond back to a receiver in response to the transmitter signal in the event tire pressure declines to an unsafe level. The receiver signal is then used to activate an alarm or indicating device.

8 Claims, 6 Drawing Figures

Patented March 27, 1973  3,723,966

INVENTORS
ROLF K. MUELLER
WILLIAM G. WOLBER
BY John R Benefiel
ATTORNEYS

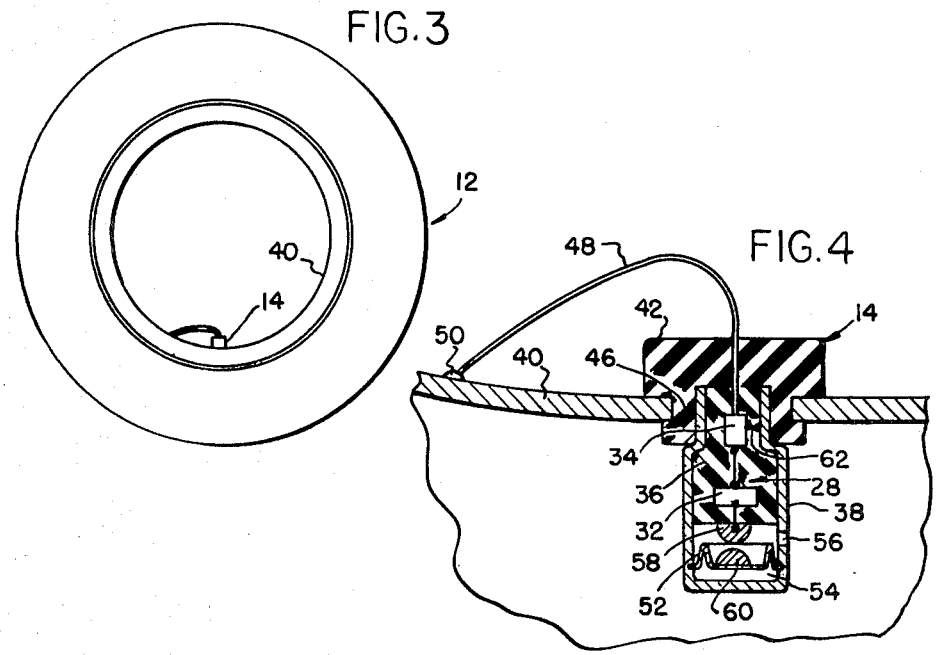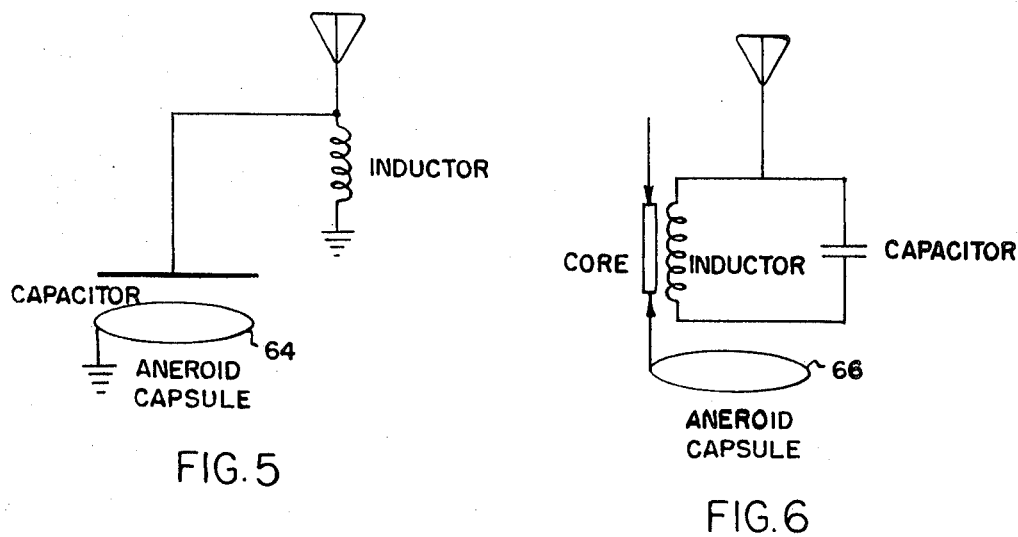
INVENTORS
ROLF K. MUELLER
WILLIAM G. WOLBER
BY John R Benefiel
ATTORNEY

INTERROGATING TIRE PRESSURE INDICATOR

BACKGROUND OF THE INVENTION

1. Field of the Invention

This invention concerns tire pressure indicators, and more specifically indicators readable at a remote location from the tire.

2. Description of the Prior Art

An effective, inexpensive vehicle tire pressure indicator which is capable of monitoring tire pressure levels and providing an indication readable by the driver during vehicle operation has long been sought, since low tire pressures often lead to excessive heat buildup and tire failures, particularly for radial ply or belted bias tires of steel or fiber glass belt material. These failures are usually without previous warning and often lead to loss of control of the vehicle, with the resultant damage, injury, and loss of life. In the case of large, expensive truck tires, damage to the tires often occurs during vehicle operation as a result of low tire pressures, before an operator is aware of the condition, and hence operating costs could be reduced if such an arrangement were available and economically feasible.

One prior art approach has involved the use of radio transmitters and receivers, and which usually utilized a transmitter on each wheel adapted to transmit a radio signal to a receiver in the event the tire pressure at any wheel declined to an unsafe level. Examples of these systems are found in U.S. Pat. Nos. 2,966,658, 3,111,644, and 3,223,969. However, the necessity for an active transmitter to be mounted at each wheel required a power source to be carried by the wheel or tire, or that slip rings be provided to either supply power to the transmitter or to supply an indicator signal to a frame mounted transmitter. Either approach involves added maintenance problems and expense, and has prevented widespread adoption of such a system.

Another approach as disclosed in the U.S. Pat. to Field, No. 3,092,806 has attempted to solve this problem by means of a passive detector element mounted on the wheel and inductively coupled to a sensing circuit by means of juxtaposed coils, one on the vehicle frame and one on the vehicle wheel. However, this approach requires rotationally symmetrical, closely spaced coil members, which also involves not a little expense, and subjects these components to the vibration and shock caused by uneven road surfaces, and weathering caused by its exposed location.

Therefore, it is an object of the present invention to provide a remote tire pressure indicator which does not require complex or expensive components to be mounted on the vehicle wheels or tires or in an exposed position on the vehicle frame, and does not require an active sensor element.

SUMMARY OF THE INVENTION

This object and others that will become apparent upon a reading of the following specification and claims is accomplished by using a passive transponding sensor carried by each of the vehicle wheels interrogated by a radio transmitter-receiver unit to produce an indicator signal whenever a tire pressure declines to an unsafe level.

BRIEF DESCRIPTION OF THE DRAWINGS

FIG. 3 is an elevational view of a wheel and tire assembly with the transponding element installed.

FIG. 4 is a sectional view of the transponder installation shown in FIG. 3.

FIG. 5 is a schematic representation of an alternate transponder arrangement.

FIG. 6 is a schematic representation of another alternative transponder arrangement.

DETAILED DESCRIPTION

In the following detailed description, certain specific terminology will be utilized for the sake of clarity and a specific embodiment described in order to provide a complete understanding of the invention, but the invention is not so limited and may be carried out in a variety of forms and embodiments.

Figure 1:
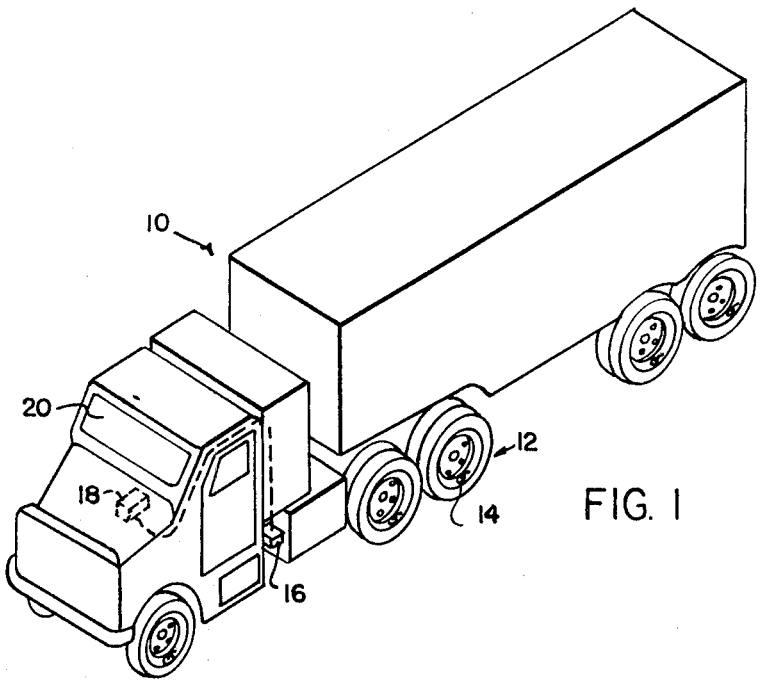
FIG. 1 is a perspective view of a vehicle equipped with an indicator system according to the present invention.

Referring to the drawings, and particularly FIG. 1, a vehicle 10 is depicted, shown as a tractor-trailer, but which may be a passenger vehicle, bus, etc. Each wheel and tire assembly 12 has a transponder 14 mounted thereon, adapted to cooperate with a transmitter-receiver unit 16, which is in turn adapted to activate a display unit 18 mounted in the vehicle driver compartment 20.

Figure 2:
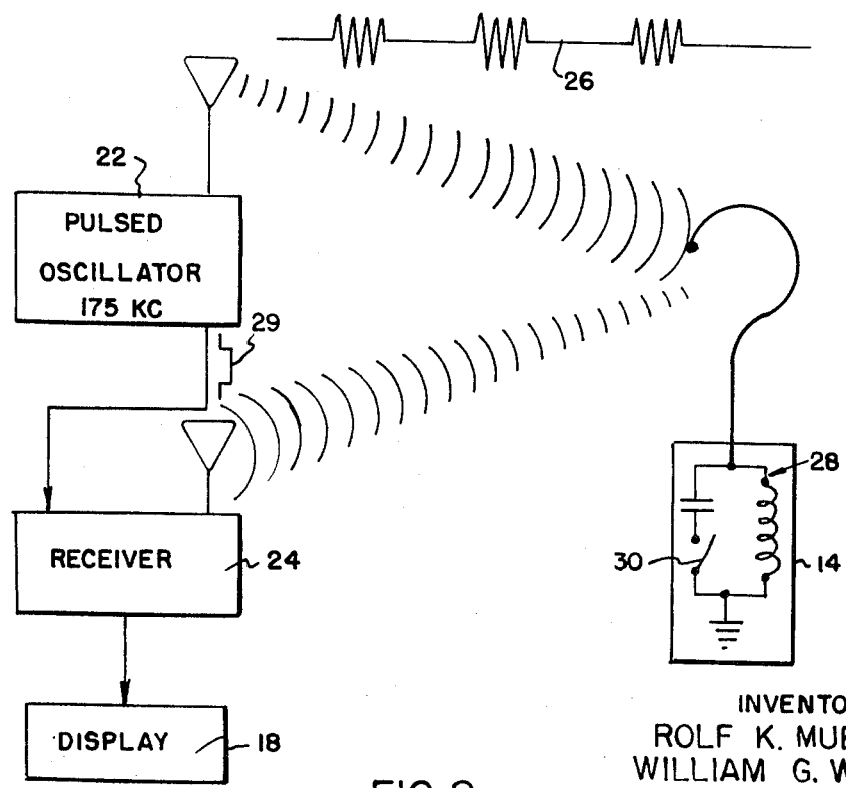
FIG. 2 is a block diagram of the indicator system of the present invention.

FIG. 2 illustrates in block diagram form the functional relationship between the transponders 14, the transmitter-receiver 16, and the display unit 18.

The transmitter-receiver unit 16 consists of a transmitter unit 22 and a receiver unit 24 with the transmitter 22 designed to periodically emit radio frequency, such as (175Kc) signals, graphically depicted at 26, which are received by the transponder 14. The transponder 14 consists of a resonant Lc circuit 28 turned to the frequency of the transmitted signal, so that if the circuit 28 is closed by the switch 30 at the time the transmitter is emitting, the circuit 28 will continue to oscillate after the transmitted signal is discontinued.

This in turn will produce a transponded radio signal which is received by the receiver unit 24, which in turn activates a display device 18 in response thereto.

In order to prevent activation of the display unit 18 in response to the transmitter-receiver unit 16 emitted signals, a gating pulse signal 29 is generated when the signal 22 is emitted and used to deactivate the receiver unit 24 and reactivate the receiver unit 24 whenever the transmitter signal is not being emitted.

Since suitable transmitter-receiver units and indicator devices are well known in themselves, it is not felt necessary to describe these in any detail.

The switch 30 is adapted to be operated by the pressure level existing in each tire so as to be closed whenever the pressure level declines to an unsafe point, in a manner as will be described herein, so that the display unit 18 will provide an indication of such occurrence.

Referring to FIGS. 3 and 4, the details of the transponder 14 installation are shown.

The circuit coil 32 and capacitor 34, selected to provide an oscillatory circuit of the same frequency as that transmitted by the transmitter 22, are embedded in a protective rubber or plastic core 36 carried by a metallic housing 38, which is in turn supported in the wheel rim 40 by a rubber grommet 42 which also serves to seal the opening 46 formed in the rim 40.

An antenna loop 48 is provided, passing out through the grommet 42 and grounded to the rim 40 at 50, to provide a ground for the transponder tuned circuit 28 as well as to secure the antenna against movement due to rotation of the tire and wheel assembly 12.

In order to complete the circuit 28 under low pressure conditions, a resilient, conductive diaphragm 52 is provided, defining a sealed chamber 54 containing air or some other fluid at a pressure less than that existing in the tire at normal pressure levels.

An opening 56 is formed in the housing to allow the pressure within the tire to be exerted on the conductive diaphragm 52. A pair of contacts 58 and 60 are provided, with the contact 58 electrically connected to the tuned circuit elements 32, 34 and contact 60 electrically connected to the conductive diaphragm 52.

Whenever the pressure in the tire is within normal limits, the contacts 58 and 60 are separated as shown, the tuned circuit 28 remains open, and hence no signal is picked up by the receiver 24 in response to the interrogating signals emitted by the transmitter 22.

Whenever the tire pressure declines to an unsafe level, the pressure in the chamber 54 forces the conductive diaphragm 52 and contact 60 upwardly until the contact 58 engages contact 60 and the tuned circuit is completed via the conductive diaphragm 52, the housing 39 and connection 62.

Thus when the next pulse of transmitter signals is emitted by the transmitter 22, the tuned circuit 28 will begin to oscillate and transpond with a radio signal which is of the same frequency. This signal is in turn picked up by the receiver 24 and used to operate the display 18, to apprise the operator of the unsafe condition of the particular tire.

Many variations of this basic system are possible, as for example the use of the transponding circuits illustrated schematically in FIGS. 5 and 6.

These arrangements vary the frequency of the transponding circuit as a function of tire pressure with an aneroid capsule 64 used to vary the capacitance of the circuit shown in FIG. 5 and an aneroid capsule 66 used to vary the inductance of the circuit of FIG. 6 to thereby tune the frequency of the respective signals. The transmitter could then be adapted to sweep the frequency range of these arrangements, and the receiver 24 and display 18 would either provide an indicator signal when tire pressure declined to an unsafe level as determined by a given transponding frequency, or alternatively provide a continuous indication of tire pressure.

Alternatively, the transmitter could be set to transmit at a fixed frequency corresponding to the frequency of the tuned circuit at an unsafe pressure level, causing the transponder to begin transponding signals to the receiver whenever tire pressure declines to such unsafe level.

Similarly, each circuit 28 can be tuned to a different frequency, with the range of frequencies swept by the transmitter 22, so that the individual low tire may be identified.

In addition to tire pressure, tire temperature, deflection, or some other such indicative parameter may be used to operate the transponder circuit control.

In order to minimize false display signals caused by random signals or those received by passing vehicles, a time delay may be included in which signals must continue to be received from the transponder in order to trigger the display.

In addition, the strength and duration of the transponder signal may be varied by incorporating a pressure aneroid operated variable resistance in the tuned circuit to thereby control the damping in the circuit, with this characteristic of the signal then utilized to indicate the tire condition.

From the above description, it can be appreciated that a low cost, simple, and reliable tire condition indicator has been provided without the need for either power sources or active transmitters mounted on the vehicle wheel assembly.

What is claimed is:

1. A vehicle wheel and tire assembly condition indicating arrangement comprising:
   transmitter means for transmitting a signal of radio frequency radiation;
   transponding means carried by said wheel and tire assembly and adapted to transpond a signal of radio frequency radiation in response to said transmitter means radiated signal;
   sensor means causing a variation in the transponding activity of said transponding means in response to variations in said wheel and tire assembly condition;
   indicator means carried by said vehicle providing indicator signals in response to said transponding means radiated signal indicating a variation in said wheel and tire assembly condition.

2. The arrangement of claim 1 wherein said sensor means includes pressure sensing means causing a variation in said transponding means activity in response to a change in tire pressure.

3. The arrangement of claim 2 wherein said sensing means includes means causing said transponding means to be inoperative above a predetermined pressure level in said tire.

4. The arrangement of claim 3 wherein said transponding means includes an oscillatory circuit and said sensor means includes means interrupting said circuit whenever said tire pressure exceeds a predetermined pressure level.

5. The arrangement of claim 1 wherein said transponding means includes a variable frequency oscillatory circuit and wherein said sensor means includes means varying the frequency of said oscillatory circuit in response to changes in said wheel and tire assembly condition.

6. The arrangement of claim 5 wherein said sensor means varies the capacitance of said circuit as a function of tire pressure.

7. The arrangement of claim 5 wherein said sensor means varies the inductance of said circuit as a function of tire pressure.

8. The indicator arrangement of claim 1 further including a plurality of said transponding means each carried by a respective wheel and tire assembly and wherein each of said transponding means signals is of a different frequency, and wherein said transmitter means transmits signals of a range of frequencies including said frequencies of each of said transponding means.

* * * * *